US006421068B1

(12) United States Patent
Ingrassia, Jr. et al.

(10) Patent No.: US 6,421,068 B1
(45) Date of Patent: Jul. 16, 2002

(54) METHOD FOR COLLECTING AND DISPLAYING INFORMATION FOR ACTIVEX CONTROLS SIMPLIFYING CTI ENABLED APPLICATION DEVELOPMENT

(75) Inventors: Michael I. Ingrassia, Jr.; Alexander Rios, both of Edison; James A. Shelton, Holmdel, all of NJ (US); John A. Yaggie, Springboro, OH (US)

(73) Assignee: NCR Corporation, Dayton, OH (US)

( * ) Notice: Subject to any disclaimer, the term of this patent is extended or adjusted under 35 U.S.C. 154(b) by 542 days.

(21) Appl. No.: 08/923,474

(22) Filed: Sep. 4, 1997

(51) Int. Cl.⁷ .................................................. G06F 3/00
(52) U.S. Cl. ........................ 345/762; 345/765; 345/835; 345/764
(58) Field of Search ................................. 345/333, 334, 345/339, 348, 349, 970, 762, 764, 765, 835, 837, 838

(56) References Cited

U.S. PATENT DOCUMENTS 4,653,090 A * 3/1987 Hayden ........................ 379/204
5,455,854 A * 10/1995 Dilts et al. ................... 379/201
5,511,116 A * 4/1996 Shastry et al. ............... 379/201
5,608,789 A * 3/1997 Fisher et al. ................. 379/201
5,742,596 A * 4/1998 Baratz et al. ................ 370/356
5,754,636 A * 5/1998 Bayless et al. .............. 379/142

* cited by examiner

Primary Examiner—Raymond J. Bayerl
Assistant Examiner—Cuong T. Thai
(74) Attorney, Agent, or Firm—Ying Tuo; Lowe Hauptman Gilman & Berner, LLP

(57) ABSTRACT

Described is a method of creating objects for collecting textual information from a CTI server and display the textual information in an application for controlling a telephony system and for allowing users to enter information associated with a call and having this information automatically associated with the call information stored in a CTI server. The objects are created by selecting reusable image symbols and embedding them into an application, without requiring an application developer to write any programming code. After being embedded into an application, these objects are able to correct textual information from the CTI server and display the textual information within the objects. These objects are also able to collect textual information entered by a user and pass this information to the CTI server.

30 Claims, 15 Drawing Sheets

US 6,421,068 B1

METHOD FOR COLLECTING AND DISPLAYING INFORMATION FOR ACTIVEX CONTROLS SIMPLIFYING CTI ENABLED APPLICATION DEVELOPMENT

CROSS REFERENCE

This application relates to another NCR's application 7341.00 entitled Method For Managing States Within Activex Controls Simplifying CTI Enabled Application Development, Ser. No. 08/916,620 filed Aug. 22, 1997.

BACKGROUND OF THE INVENTION

The present invention relates generally to a method for developing graphical user interfaces for Computer Telephone Integration CTI applications.

Computer Telephony Integration (CTI) enables a computer system to control a telephony system and a telephony system to access to a computer system. While the existing CTI development methods are often robust, a shortcoming of the existing CTI development methods is that they are difficult to use to develop end user CTI interfaces, because they require developers and integrators to understand the details of how a particular telephony system and CTI system operate internally. A main contributing reason to such a shortcoming is the lack of an accepted standard for telephony integration, which has led to the development of several proprietary and non-proprietary interfaces to the various telephony hardware vendor platforms.

At the current time, ActiveX is an effective platform to develop graphical user interfaces for CTI applications. ActiveX is a software technology developed by Microsoft® for object oriented development of reusable software components. In a CTI application developed on an ActiveX platform, the application may need to collect and display textual information while the software components are interacting with a telephony system. In a conventional graphical user interface developed on ActiveX platform, customer code has to be developed to interact with a CTI server to collect information from the CTI server and display this information in respective text objects. Writing this code requires developers and integrators to understand the details of how a particular telephony system and CTI server operate internally.

Therefore, there has been a need to provide a method for designing software components for CTI solutions, which is easy to use by CTI system developers and integrators.

There has been another need to provide a method for collecting textual information and displaying it in text objects, without requiring the knowledge of details of telephony systems and CTI servers, thus simplifying and improving the efficiency of CTI application development and maintenance.

The present invention meets these two needs.

SUMMARY OF THE INVENTION

In one aspect, the invention provides a method for displaying information generated from a communication management system. The method comprises the steps of:

(a) creating an object image symbol;

(b) defining a behavior for said created object image symbol without requiring writing programming code; and (c) collecting the information from the communication management system and displaying the information with said object image symbol.

In another aspect, the invention provides a method for inputting information from an application to a communication management system. The method comprises the steps of:

(a) creating an object image symbol;

(b) inputting the information into said object image symbol; and (c) collecting the information from said object image symbol and sending the information to the communication management system.

Still in another aspect, the invention provides a method for inputting information from an application to a communication system, and for creating an entry in the communication management system and sending the information to the created entry. The method comprises the steps of:

(a) creating an object image symbol in the application;

(b) inputting information into said object image symbol;

(c) creating an entry in the communication management system; and (d) collecting said information from said object image symbol and sending said information to said entry.

These and other features and advantages of the present invention will become apparent from the following description and accompanying drawings.

BRIEF DESCRIPTION OF THE DRAWINGS

The purpose and advantages of the present invention will be apparent to those skilled in the art from the following detailed description in conjunction with the appended drawings, in which.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiments will be readily apparent to those skilled in the art, and the principles defined herein may be applied to other embodiments and applications without departing from the spirit and scope of the invention. Thus, the present invention is not intended to be limited to the embodiments shown, but is to be accorded with the broadest scope consistent with the principles and features disclosed herein.

Figure 1:
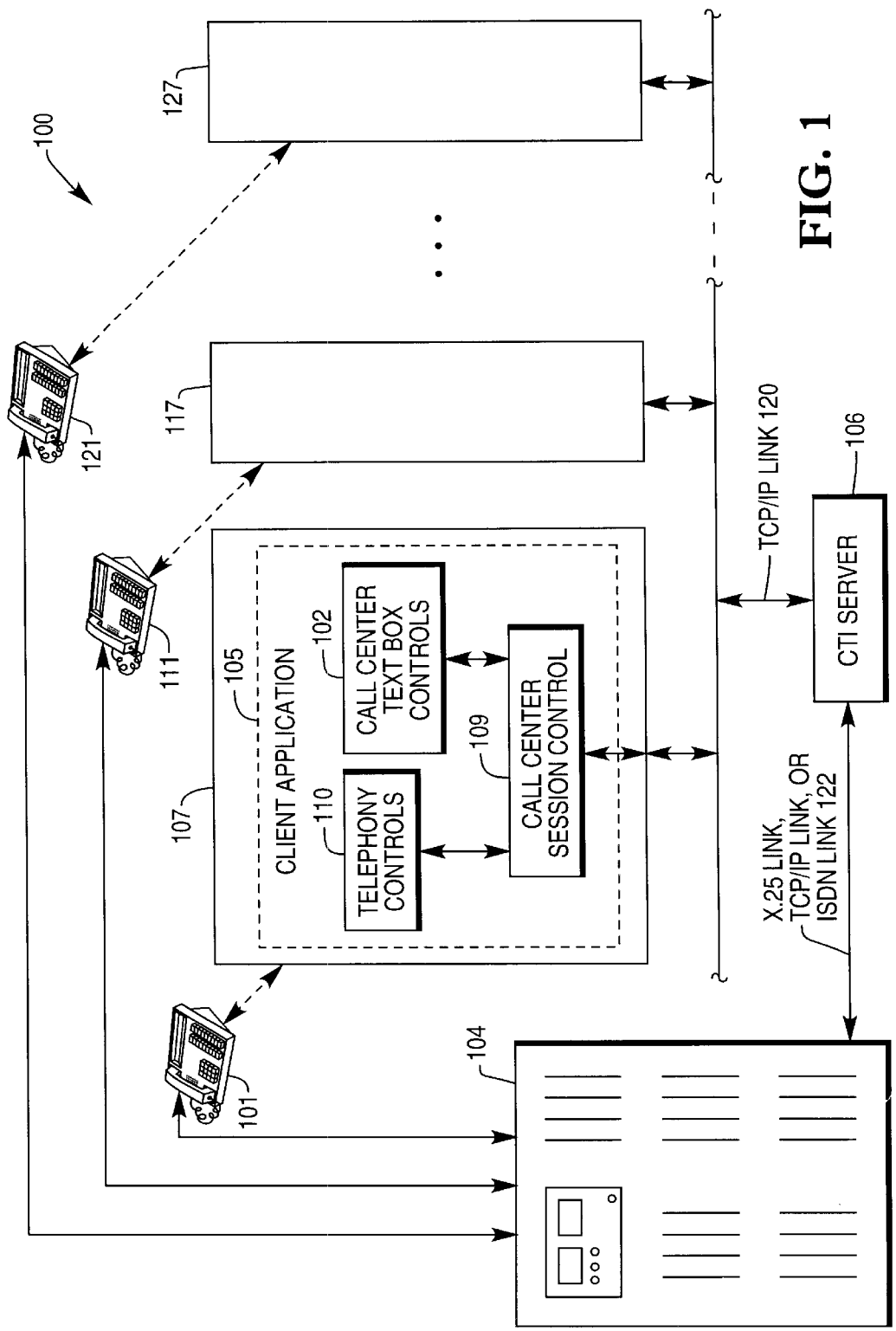
FIG. 1 shows a block diagram for a CTI system, in accordance with the present invention.

Referring to FIG. 1, there is shown a block diagram for a CTI system 100 in accordance with the present invention.

As shown in FIG. 1, the CTI system includes a telephony hardware 104, a CTI server 106, a plurality of telephone sets (101, 111, . . . , 121), and a plurality of workstations (107, 117, . . . , 127). As indicated by dotted lines, the plurality of workstations (107, 117, . . . , 127) are associated with the plurality of telephone sets (101, 111, . . . , 121) respectively. Specifically, a workstation and an associated telephone set are located in close vicinity so that an agent can conveniently operate both the workstation and the associated telephone set. The plurality of telephone sets are controlled by telephony hardware 104 (i.e. a switch or PBX- Private Branch Exchange) to receive or place call.

Described as a representative of the plurality of the workstations, workstation 107 contains a client application 105, which includes three software components: a call center session control 109, call center text box controls 102, and telephony controls 110.

Telephony hardware 104 can be used in a call center facility, which typically includes a set of telephones, a set of communication lines, a telephone switch (such as PBX), a plurality of workstations, and at least one computer system. A telephone switch is designed to switch incoming calls from the outside world to a set of telephones installed in a building, and enables a group of users to share a fixed set of communication lines connected to the outside world. For example, a building with 1000 telephones may share 200 outside lines from a telephone central office. A typical call center may have many agents with each of them using one or more telephones to communicate with each other. An agent can use a workstation to interact with the telephony hardware, the computer system, the incoming calls, and the other agents, to serve the business needs of a call center. For example, the agents in a call center can use workstations to process customer calls to provide billing or credit card service.

In FIG. 1, CTI server 106 is a combination of hardware (a computer system including processing unit and memory device) and software (server software and applications run on the computer system). CTI server 106 includes the software components to: (1) control telephony hardware 104 (i.e. a telephone switch or PBX) to route telephone calls, (2) notify the software running on a workstation of the arrival of a call to a telephone associated with the workstation and the changes of the call state (i.e. a call is ringing, is on hold, is being transferred, is hung up, etc.), (3) enable the application running on a Workstation to control a call to a telephone associated with the workstation, (4) maintain a centralized repository for information associated with each call being managed, and (5) provide mechanisms for the retrieval and storage of the information in the centralized repository. CTI server 106 may also contain special hardware to interact with telephony hardware 104.

Call center text box controls 102 contains a plurality of individual call center text box controls with each of them being able to collect textual information from the CTI server 106 and display it in the a call center text box, and being able to retrieve information entered in the call center text box and pass it to CTI server 106.

Telephony controls 110 contains a plurality of individual controls (or individual control commands) with each of them being able to perform a specific control task.

Call center session control 109 is able to establish a connection to CTI server 106, and to monitor and manage all events and requests to and from a CTI environment. Events are notifications of activities (or call states) that have happened or are happening in the CTI environment including telephony hardware 104. For example, the ringing event is the notification from a CTI server to a client (i.e. the application running on a workstation) that a telephone is ringing. Requests are commands issued by the application running on a workstation to ask for services (or controls) to be performed (i.e. send all events received on telephone extension 4000 to the application, place the current call on extension 4000 on hold, transfer the current call on extension 4000 to extension 4001, etc.).

Figure 2:
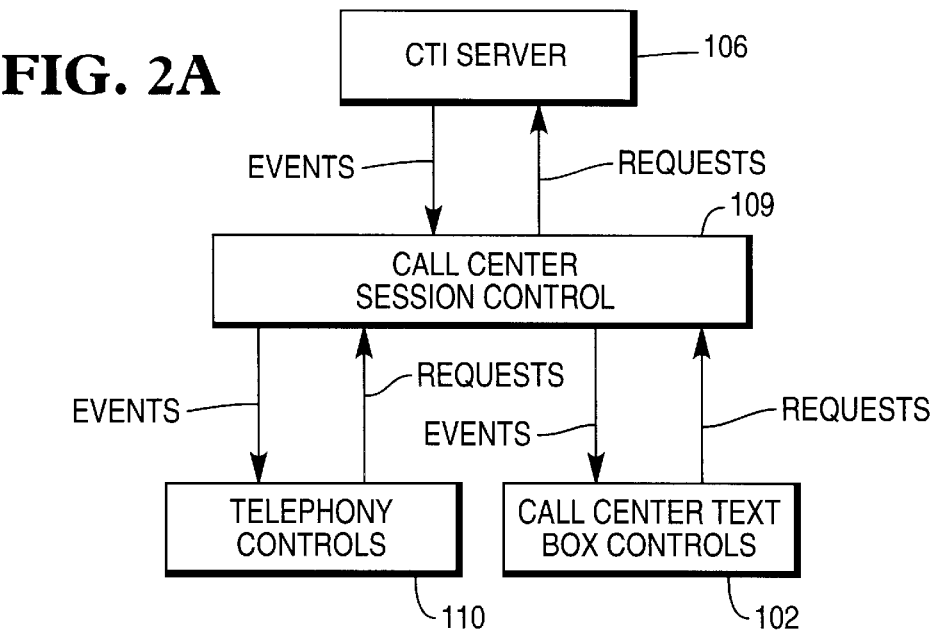
FIG. 2A shows a block diagram illustrating signaling flow between CTI server 106 and telephony controls 110, in accordance with the present invention.
FIG. 2B shows a call information table for each call.

Referring to FIG. 2A, there is shown a block diagram illustrating signaling flow between CTI server 106 and the controls (including call center text box controls 102 and telephony controls 110). As shown in FIG. 2, call center session control 109 processes the signaling flow between CTI server 106 and the controls 102, 110. More specifically, call center session control 109 receives any events from CTI server 106, and forwards these events to the appropriate call center text box controls 102 and telephony controls 110 upon identifying which of the controls should be informed about these events. Call center session control 109 also receives any requests from call center text box controls 102 and telephony controls 110, and informs CTI server 106 to perform action in response to these requests.

The advantages for the signaling flow shown in FIG. 2A are at least two fold:

First, all the complex program code required to properly connect each of the call center text box controls 102 and telephony controls 110 to a CTI environment is solely processed by call center session control 109. Each of the call center text box controls 102 and telephony controls 110 is only responsible for acting on designated events sent to it by call session control 109.

Second, new controls can be easily developed and added into a CTI system. All that is needed is to design the program code required to respond to the respective events and register this newly developed control to call center session control 109. To keep track of the registration of individual controls, call session control 109 maintains a list, which contains the names of the individual controls and the events designated to respective individual controls. By adding the name of the newly developed control and the designated events to the list, the control is added in call center session control 109.

In the embodiment shown in FIG. 1, the individual controls in call center text box controls 102 and telephony controls 110 are created on ActiveX platform. ActiveX is a software technology developed by Microsoft® for object oriented development of reusable software components. A control (a command or a call center text box) designed on ActiveX platform is an object that associates with methods, properties, and events unique to it.

Referring to FIG. 2B, there is shown a call information table 200 that is dynamically formed and maintained by CTI server 106 for each call. The CTI server uses a particular call information table to keep track of information on each call.

CTI server 106 maintains a unique ID that can be used to refer to each call and that can also be used as an index to a call information table 200 for each call. As shown in FIG. 2B, the call information table 200 contains a plurality of entries with each of the entries having two fields (name and value fields). A name field can be used to identify a respective entry in the call information table. Specifically, the call information table typically includes the following name fields: telephone number, (customer) name, address, city, state, account balance, ANI (Automatic Number Identification), and DNIS (Dialed Number Identification Service). It should be noted that the specific name fields in call information table 200 are illustrative, and CTI server 106 can add any useful textual information into a call information table 200 for each call. A value field can be used to store textual information (which can be represented by ASCII) characters associated with a respective name field. Under the control of CTI Server 106, the value field of a call information table 200 can be entered or updated in three ways: (1) it can be entered through input device (such as keyboard) by an agent, (2) it can be collected from an incoming call by CTI server 106, and (3) it can be collected from other application software (for example, the application software can retrieve caller information from a database based on the call identification in an incoming call, and pass the information to a call information table). CTI server 106 treats newly entered value filed or updated value filed as an event. Call information table 200 can be stored in a memory area or in a database on a disk in CTI server 106.

Figure 3:
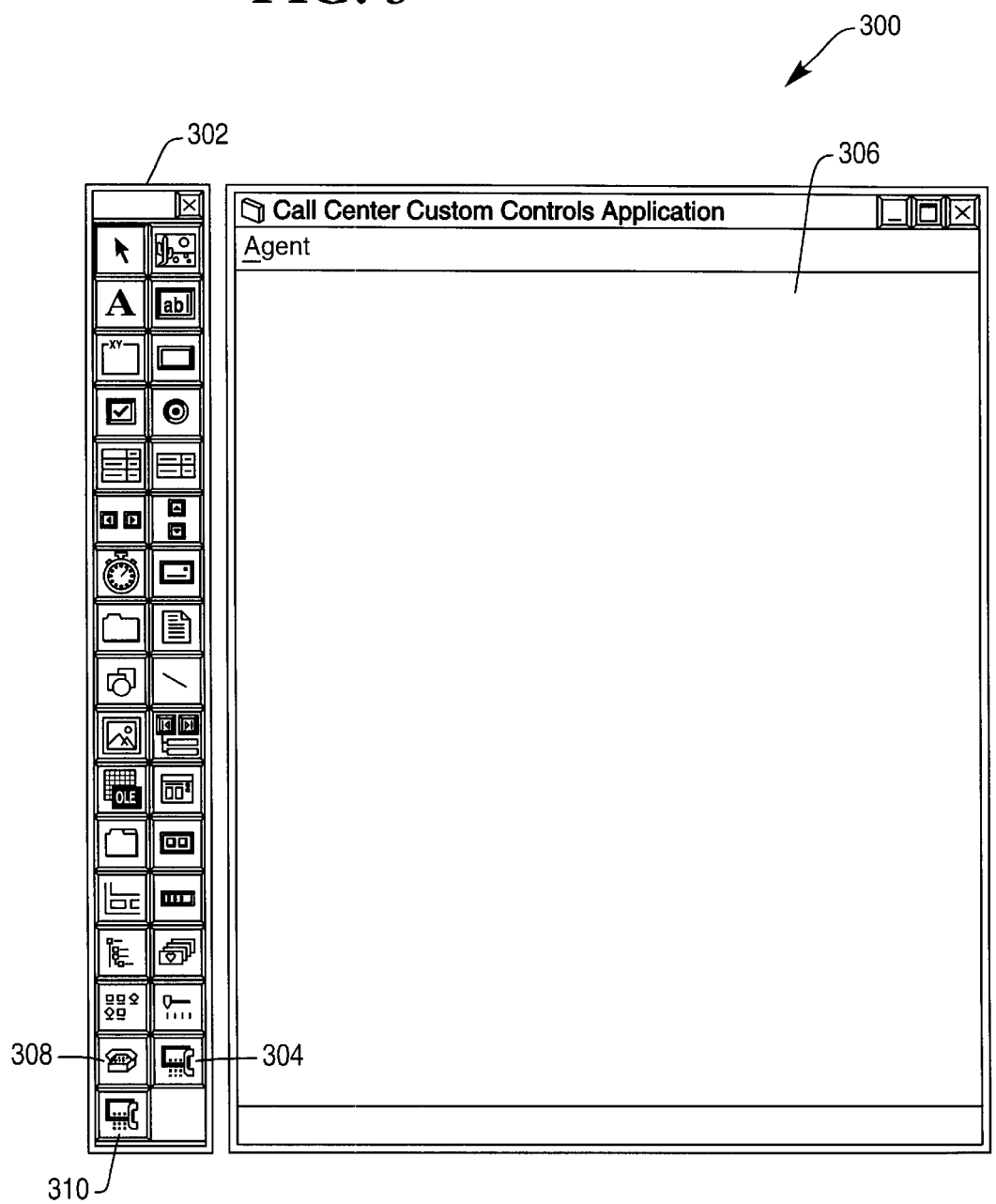
FIG. 3 shows a screen display illustrating a typical environment for creating applications with ActiveX controls.

Referring to FIG. 3, there is shown a screen display 300 on workstation 107, illustrating a typical development environment for creating applications with ActiveX controls. This interface provides a means of creating call center text box control(s) for an application, in accordance with the present invention.

As shown in FIG. 3, screen display 300 contains a tool bar set 302, which further contains three image symbols, namely: (1) Telephony Control symbol 304, (2) Call Center Session symbol 308, and (3) Call center text box Control symbol 310.

Figure 4:
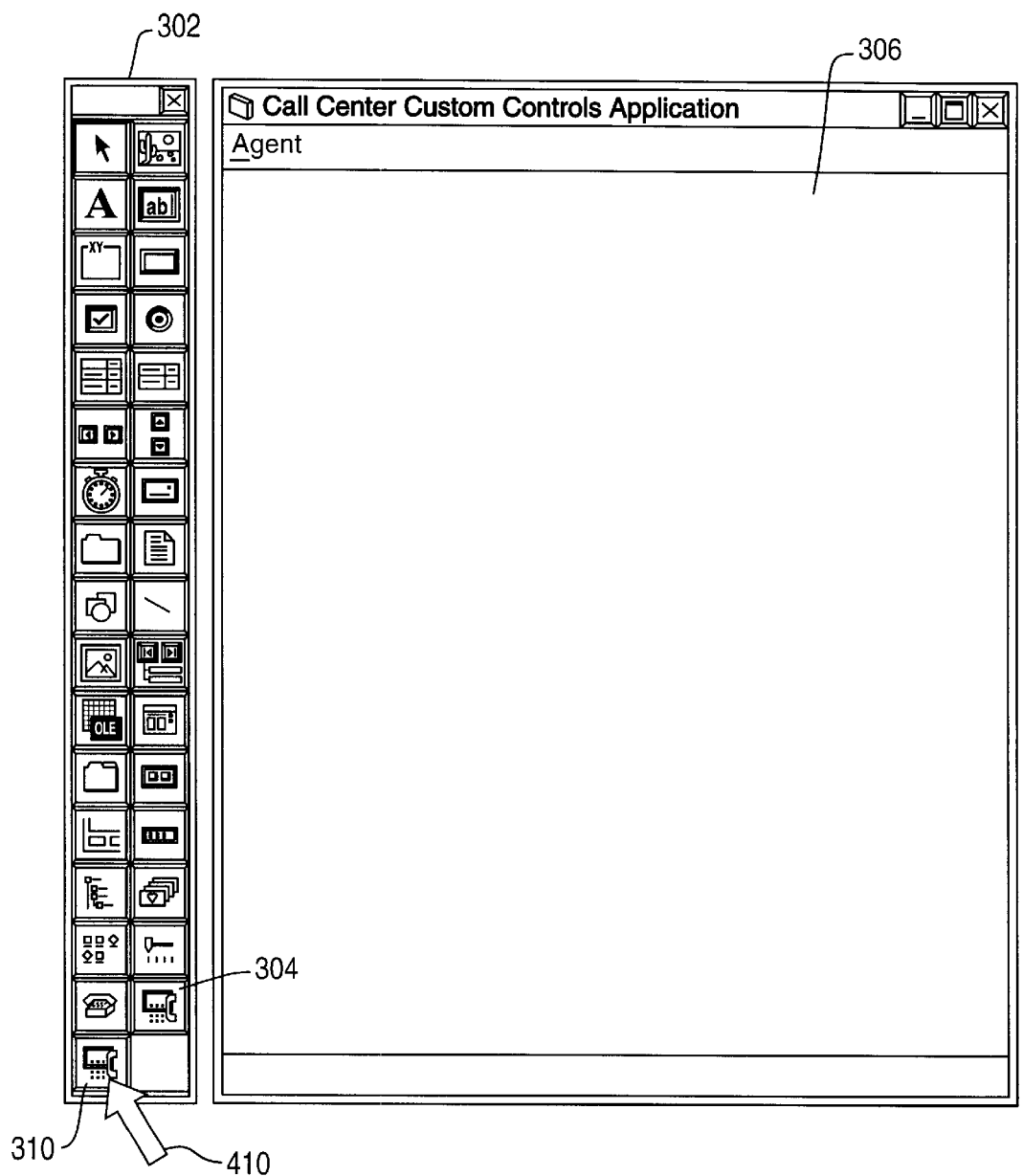
FIGS. 4, 5A and 5B show a process for creating call center text boxes, in accordance with the present invention.
Figure 5A:
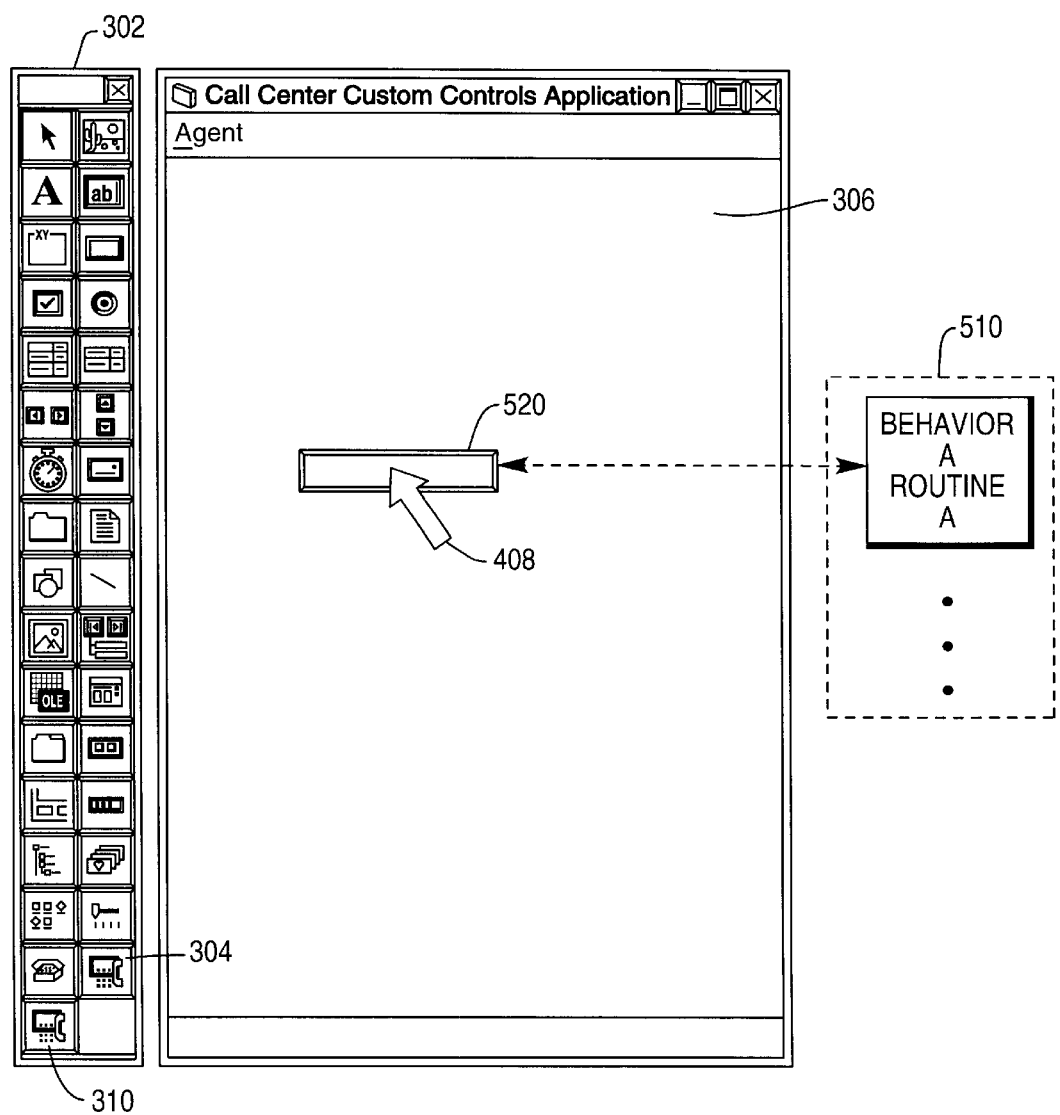
Figure 5B:
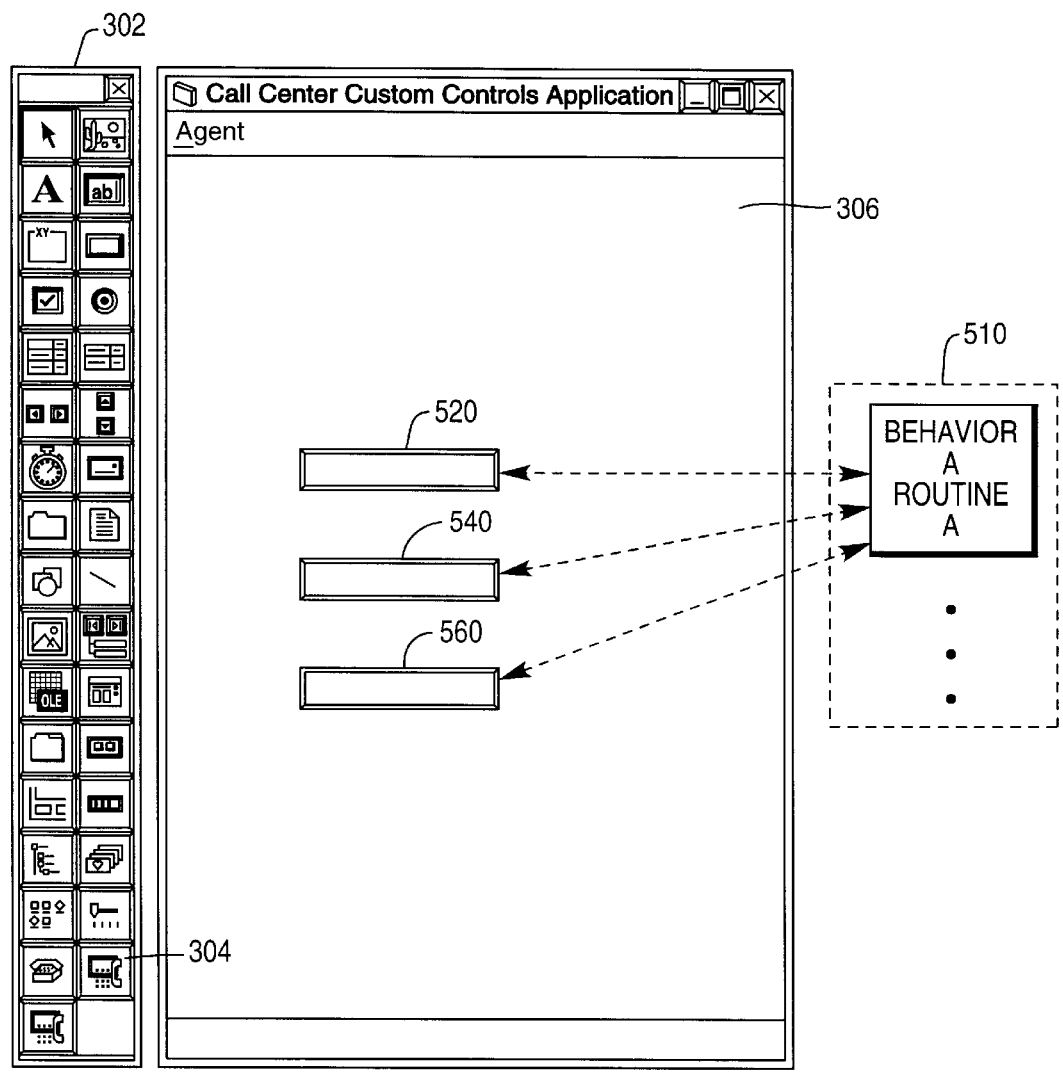

Referring to FIGS. 4, 5A and 5B, there are shown a process for creating call center text boxes (objects), in accordance with the present invention.

As shown in FIG. 4, a cursor 410 (represented as an arrow) points to Call center text box Control symbol 310. The cursor can be moved to any position on screen display 300 by a mouse (not shown). Moving the mouse while pressing the button on the mouse, a call center text box can be created within application container 306 by selecting Call center text box Control symbol 310.

Referring to FIG. 5A, there is shown a call center text box 520 created by the process shown in FIG. 4. As shown in FIG. 5A, the process shown in FIG. 4 assigns run-time behavior A (i.e. collecting textual information from a particular entry in call information table 200 and displaying the textual information in an associated call center text box) to call center text box 520, and links control program 510 and routine A for performing behavior A to call center text box 520.

Referring to FIG. 5B, there is shown two additional call center text boxes 540 and 560 created by a similar process shown in FIG. 4 and 5A. Call center text box control objects for call center text boxes 520, 540 and 560 can also be created by using three lines of Visual Basic code:

cctxtANI=createObject(CCTextBox)
cctxtDNIS=createObject(CCTextBox)
cctxtCOMMENTS=createObject(CCTextBox)

where "cctxt" stands for "call center text", and CCtextBox is a class defining a call center text box (object). Each of the three lines of Visual Basic code also assigns run-time behavior A to a respective call center text box.

Figure 6A:
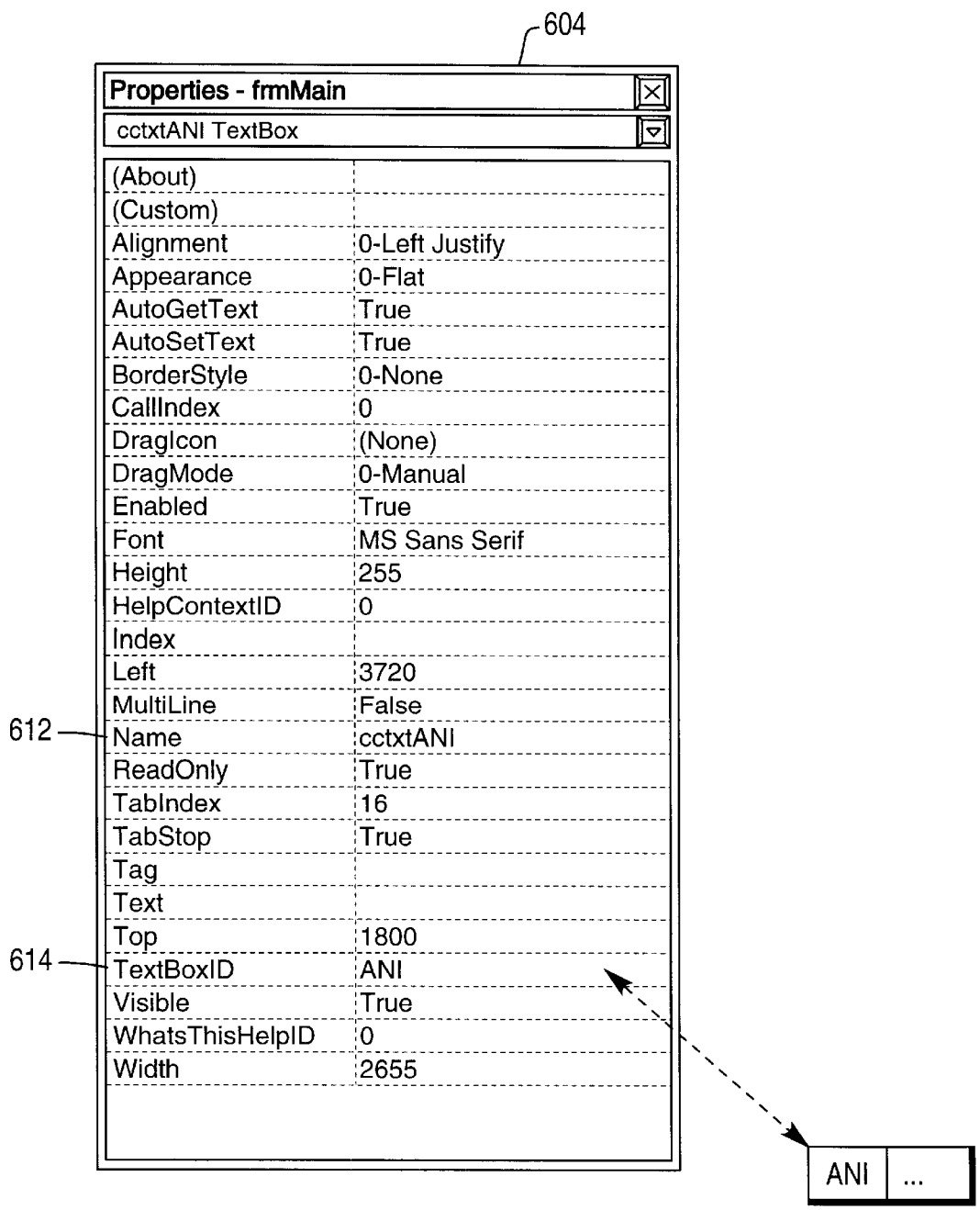
FIG. 6A, 6B or 6C shows a property table for a created text box, in accordance the present invention.

Referring to FIG. 6A, there is shown a screen display 600 on workstation 107, illustrating a property table 604 containing the properties for call center text box 520. Property table 604 can be invoked by right clicking (using a mouse) call center text box 520.

As shown in FIG. 6A, property table 604 contains a name entry 612 and a call center text box identification (TextBoxID) entry 614. Each of the entries has two columns. The left column contains control properties, and the right column contain property values. By entering cctxtANI into the right column of name entry 612, call center text box 520 is given the name cctxtANI. By entering ANI into the right column of TextBoxID entry 614, call center text box 520 will be associated with an ANI entry in a call information table at run time. At run time, behavior A uses the property values entered in the right column of property table 604 (including the value entered in TextBoxID entry 614) to collect textual information from the ANI entry in the call information table associated with a call and to display the information in call center text box 520.

Figure 6B:
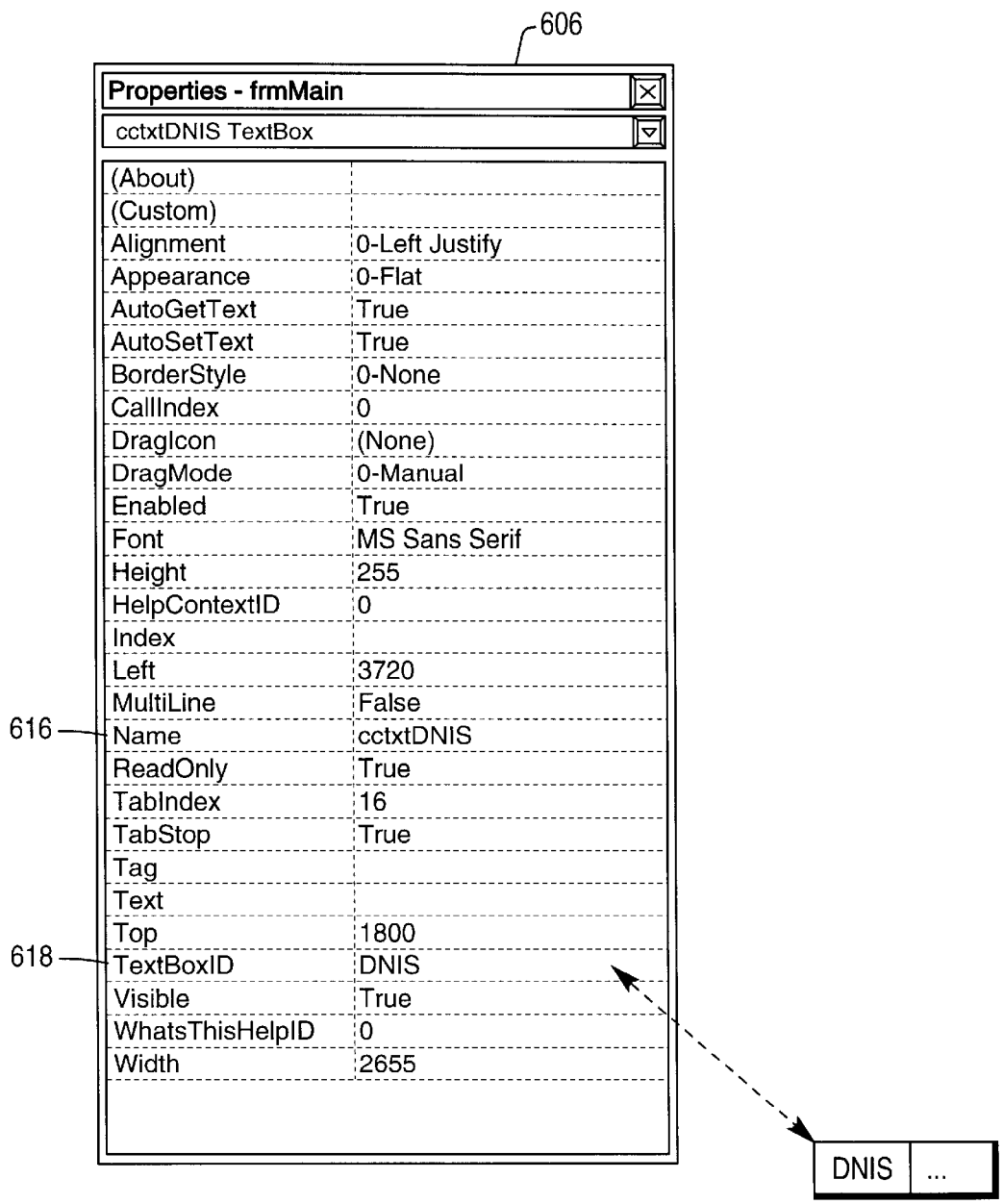

Referring to FIG. 6B, there is shown a screen display 600 on workstation 107, illustrating a property table 606 containing the properties for call center text box 540. Property table 606 can be invoked by right clicking (using a mouse) call center text box 540.

The structure of property table 606 is identical to that of property table 604. By entering cctxtDNIS into the right column of name entry 616, call center text box 540 is given the name cctxtDNIS. By entering DNIS into the right column of TextBoxID entry 618, call center text box 520 will be associated with a DNIS entry in a call information table at run time. At run time, behavior A uses the property values entered in the right column of property table 606 (including the value entered in TextBoxID entry 618) to collect textual information from a DNIS entry in the call information table associated with a call and to display the textual information in call center text box 540.

Figure 6C:
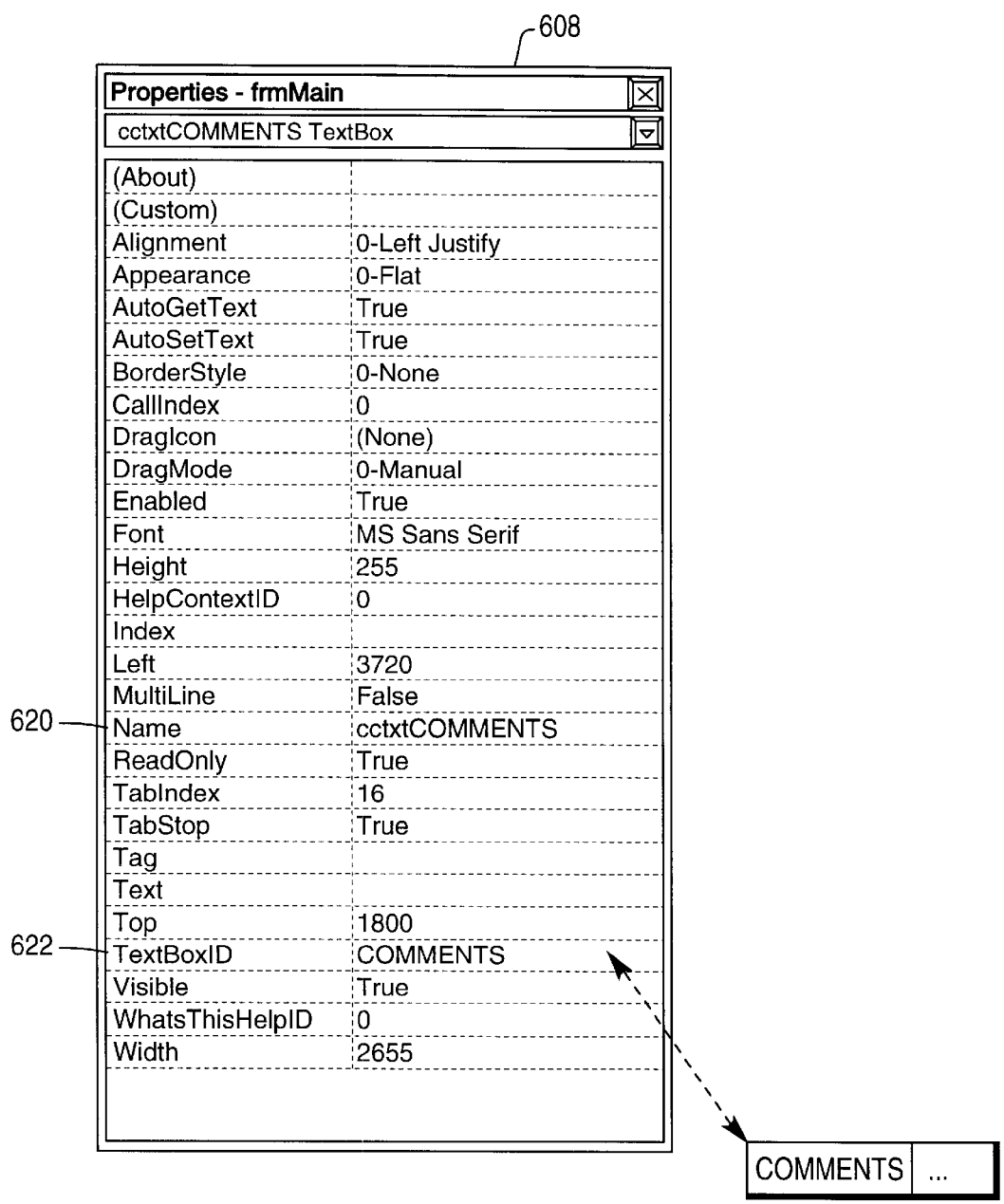

Referring to FIG. 6C, there is shown a screen display 600 on workstation 107, illustrating a property table 608 containing the properties for call center text box 560. Property table 608 can be invoked by right clicking (using a mouse) call center text box 560.

The structure of property table 606 is identical to that of property table 604. By entering cctxtCOMMENTS into the right column of name entry 620, call center text box 560 is given the name cctxtCOMMENTS. By entering COMMENTS into the right column of TextBoxID entry 622, call center text box 560 will be associated with a COMMENTS entry in the call information table at run time. At run time, behavior A uses the property values entered in the right column of property table 606 (including the value entered in TextBoxID entry 622) to collect textual information from the COMMENTS entry in the call information table associated with a call and to display the textual information in call center text box 560.

Alternatively, the processes illustrated in FIGS. 6A–C can be implemented by three lines of Visual Basic code:

cctxtANI TextBoxID="ANI"
cctxtDNIS TextBoxID="DNIS"
cctxtCOMMENTS TextBoxID="COMMENTS"

It should be noted that FIGS. 4, 5A–B, and 6A–B illustrate the operations of creating three call center text boxes, two of which are associated with two entries (ANI and DNIS) in call information table 200. The call center text boxes associated with the other entries in call information table 200 can be created by using the similar operations shown in FIGS. 4, 5A–B, and 6A–B.

Figure 7A:
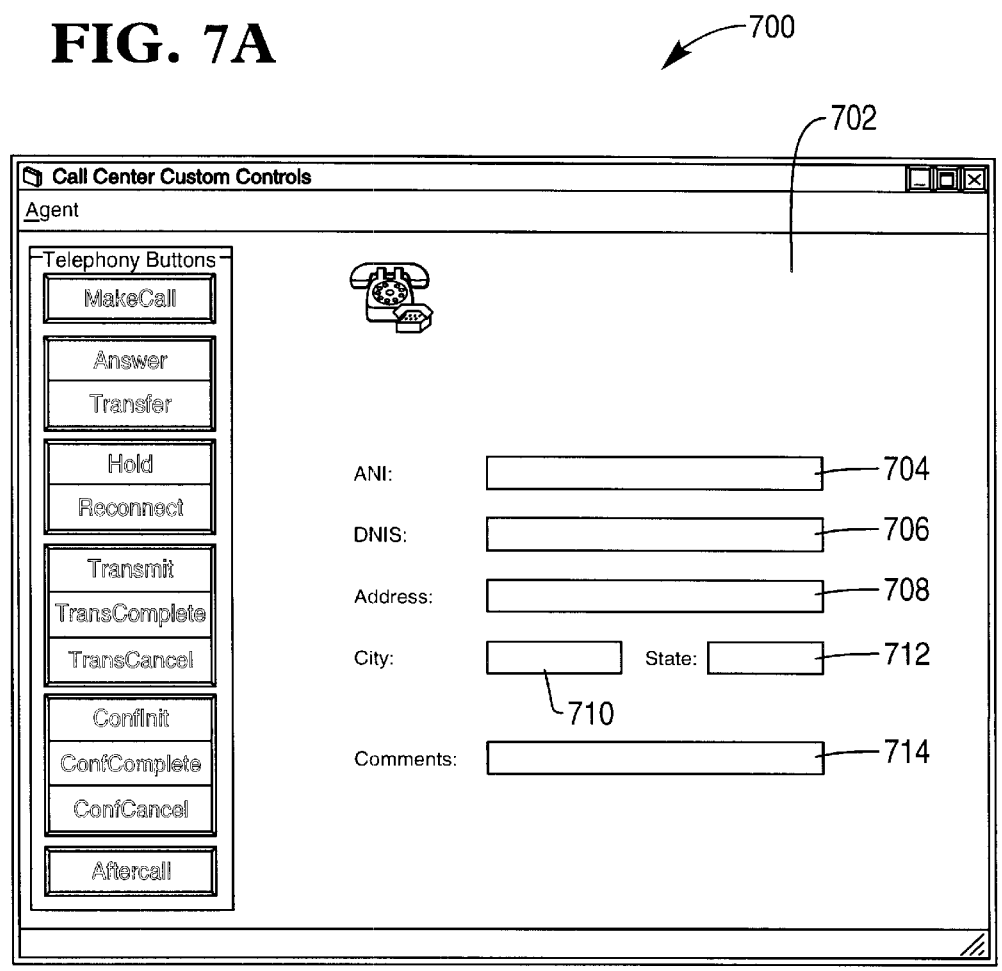
FIG. 7A, 7B or 7C shows a graphic user interface containing call center text boxes and command buttons, in accordance the present invention.

Referring to FIG. 7A, there is shown a screen display 700 on workstation 107, including twelve command buttons ("Answer", "Hang Up", "After Call", "Hold", "Reconnect", "Transfer Initiation", "Transfer Complete", "Transfer Cancel", "Conference Initiation", "Conference Complete", "Conference Cancel", and "Make Call" command buttons), a "Call Center Session" icon, and six call center text boxes (ANI call center text box 704, DNIS call center text box 706, address call center text box 708, city call center text box 710, state call center text box 712, and comments call center text box 714). All command buttons are displayed in outlined letters, indicating they are disabled. A command button is an object, which can perform a desired control function over telephony hardware 104 by clicking the command button using a mouse, only when the command button is enabled. When it is disabled, a command button will not perform any control function even it is clicked.

In FIG. 7A, the six call center text boxes represent six instances of call center text box controls 102, and the twelve command buttons represent twelve types of individual controls in telephony controls 110 (see FIG. 1). The "Call Center Session" icon is the representative symbol for call center session control 109 (see FIG. 1). The twelve command buttons, "Call Center Session" icon, and six call center text boxes are embedded into one application to form a graphical user interface to a CTI environment.

Figure 7B:
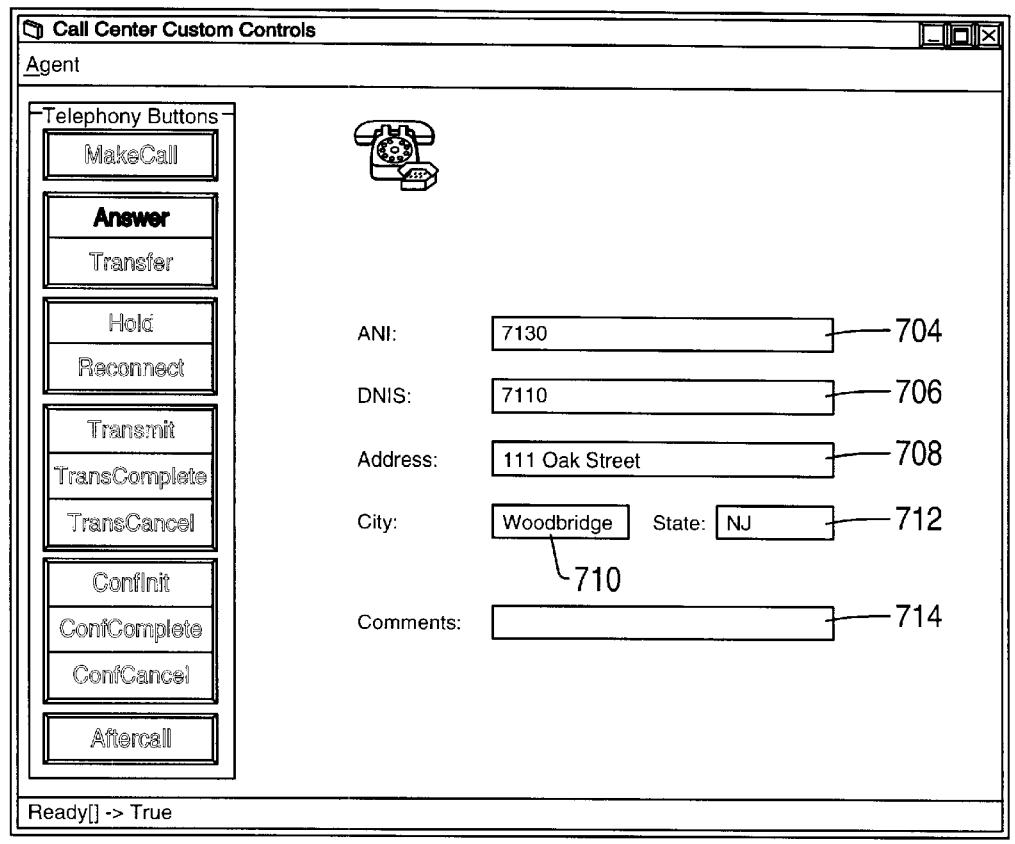

Referring to FIG. 7B, there is shown the graphical user interface in response to an incoming call at run time, in accordance with the present invention.

As shown in FIG. 7B, in response to the incoming call, the "Answer" command button is automatically enabled (indicated by solid line letters). CTI server 106 collects the ANI and DNIS in the incoming call, and stores ANI and DNIS into ANI entry 204 and DNIS entry 206 in call information table 200 respectively. The CTI server also retrieves the information about caller's address, city, and state from a database in CTI server 106 based on ANI, and stores the retrieved information into address, city, and state entries 208, 210, 212 in the call information table respectively. CTI server 106 then informs, via call center session control 109, call center text boxes 704, 706, 708, 710, and 712 the events occurred to these five entries (204, 206, 208, 210, and 212) in call information table 200. Via routine A, call center text boxes 704, 706, 708, 710, and 712 collect the information from these five entries in call information table 200 and displays it in call center text boxes 704, 706, 708, 710, and 712, as shown in FIG. 7B.

Figure 7C:
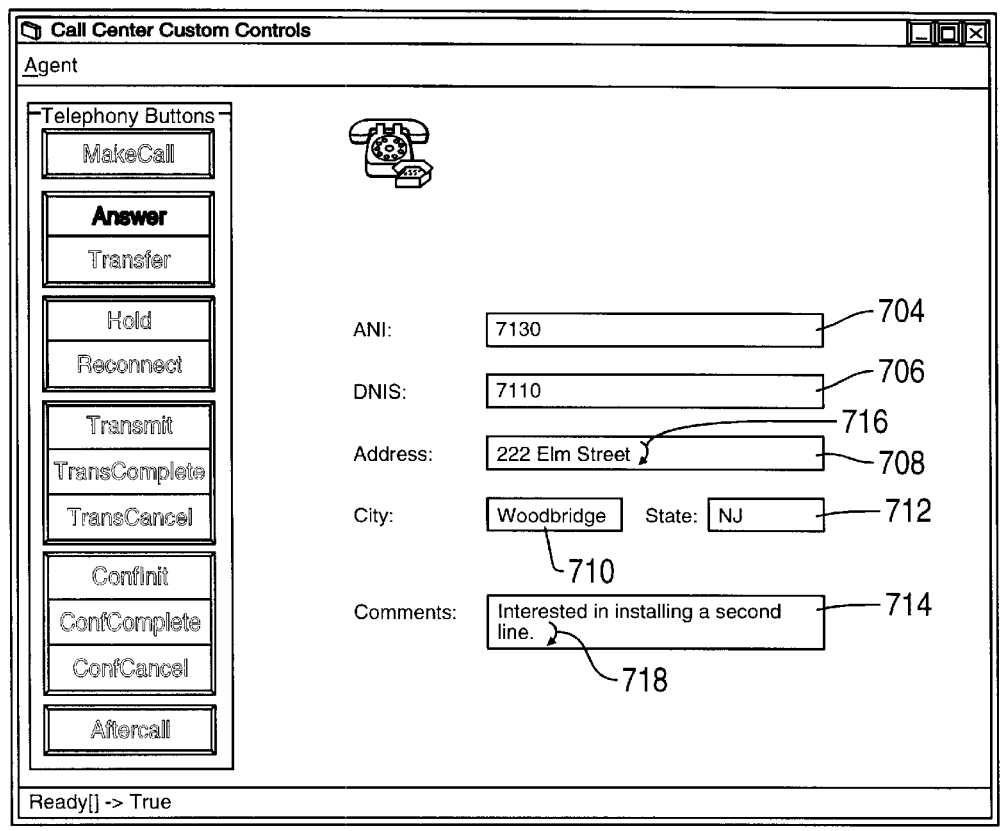

Referring to FIG. 7C, there is shown the operation in which a user changes (or inputs) information in a call center text box and updates an associated entry in a call information table at run time, in accordance with the present invention.

As shown in FIG. 7C, a user changes the information in address call center text box 708 from "111 Oak Street" to "222 Elm Street". Upon detecting a loss of focus or the pressing of the "Enter" key, address call center text box 708 (via routine A) sends a request, together with the information of "222 Elm Street", to call center session control 109, which in turn forwards the request to CTI server 106. Upon receiving the request, CTI server 106 takes the information received from call center session control 109 and stores it into address entry 208 in call information table 200.

As also shown in FIG. 7C, the user inputs "Interested in installing a second line" in comments call center text box 714. Upon detecting a loss of focus or the pressing of the "Enter" key, comments call center text box 714 (via routine A) sends a request, together with the information "Interested in installing a second line", to call center session control 109, which in turn forwards the request to CTI server 106. Upon receiving the request, CTI server 106 first creates a comments entry in call information table 200. The CTI server then stores the information "Interested in installing a second line" into the comments entry in call information table 200. In FIG. 7C, arrow 716 or 718 represents the pressing of "Enter" key.

Figure 8:
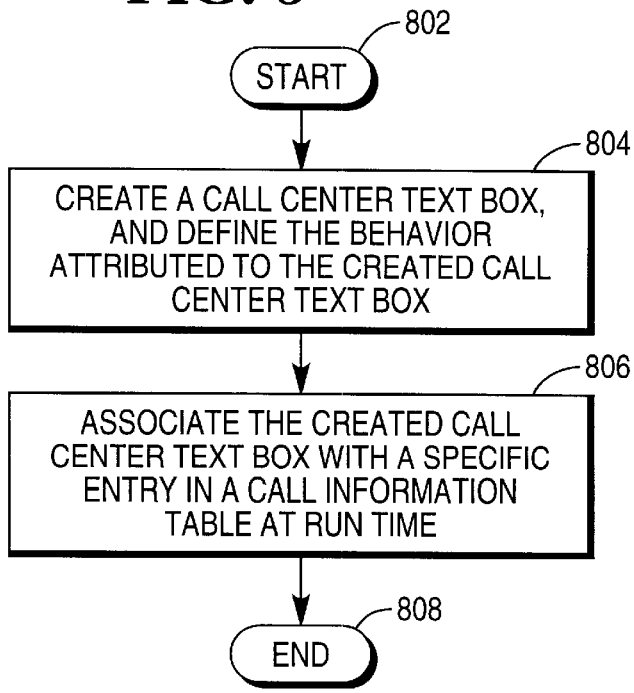
FIG. 8 shows a flowchart illustrating the operation of creating a call center text box, in accordance with the present invention.

Referring to FIG. 8, there is shown a flowchart illustrating the operation of creating a call center text box, in accordance with the present invention.

At step 804, a user creates a call center text box by selecting call center text box control symbol 304 or by using a line of code. In response to the selection or the line of code, the behavior attributed to the created call center text box is assigned by linking program 510 and routine A to the created call center text box.

At step 806, the user sets a value in the TextBoxID entry in the property table (see FIG. 6A or 6B) for the created call center text box, so that the created call center text box can associate itself with a specific entry in a call center information table 200 at run time.

Figure 9:
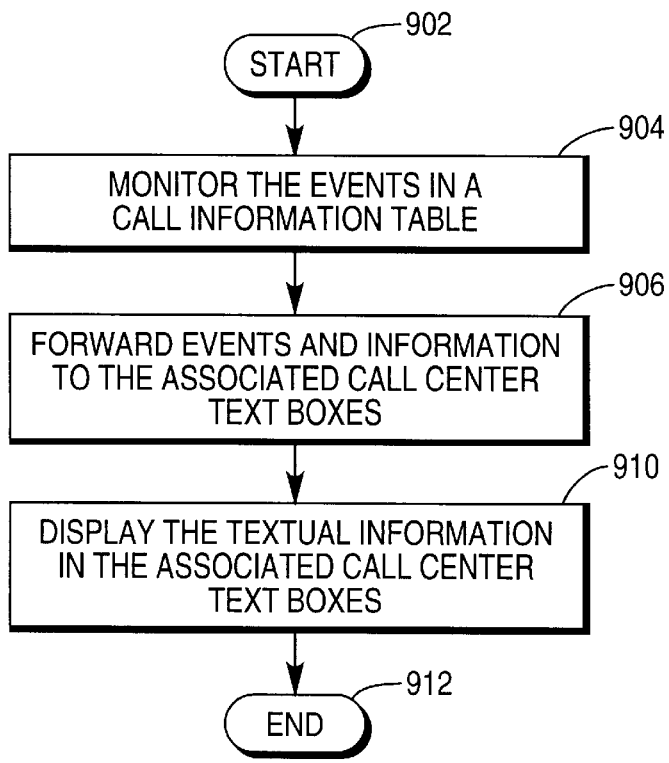
FIG. 9 shows a flowchart illustrating the operation of collecting textual information and displaying it in a call center text box, in accordance with the present invention.

Referring to FIG. 9, there is shown a flowchart illustrating the operation of collecting textual information from a call information table in CTI server 106 and displaying the information in call center text boxes at run time, in accordance with the present invention.

At step 904, CTI server 106 monitors a call information table 200 and telephony hardware 104 and generates events as necessary. In the example shown in 7B, CTI server 106 detects the ANI and DNIS in the incoming call and retrieves information from a database in CTI server 106 based on the ANI. CTI server 106 then stores the ANS, DNIS, and information retrieved into entries 204, 206, 208, 210, and 212 in call information table 200, respectively.

At step 906, after detecting any events that occurred to the entries in the call information table 200 or in telephony hardware 104, CTI server 106 forwards the events, together with the information stored in the entries, to call center session control 109. Call center session control 109 in turn informs the associated call center text boxes of the events in the call information table 200. In the example shown in 7B, call center session control 109 informs call center text boxes 704, 706, 708, 710, and 712 that events have occurred in associated entries 204, 206, 208, 210, and 212 in call information table 200. This invokes routine A, which has been linked to call center text boxes 704, 706, 708, 710, and 712.

At step 910, routine A collects the textual information from call center session control 109, and displays the textual information in the associated call center text boxes. In the example shown in 7B, the information stored in entries 204, 206, 208, 210, and 212 in call information table 200 are displayed in call center text boxes 704, 706, 708, 710, and 712, respectively.

Figure 10:
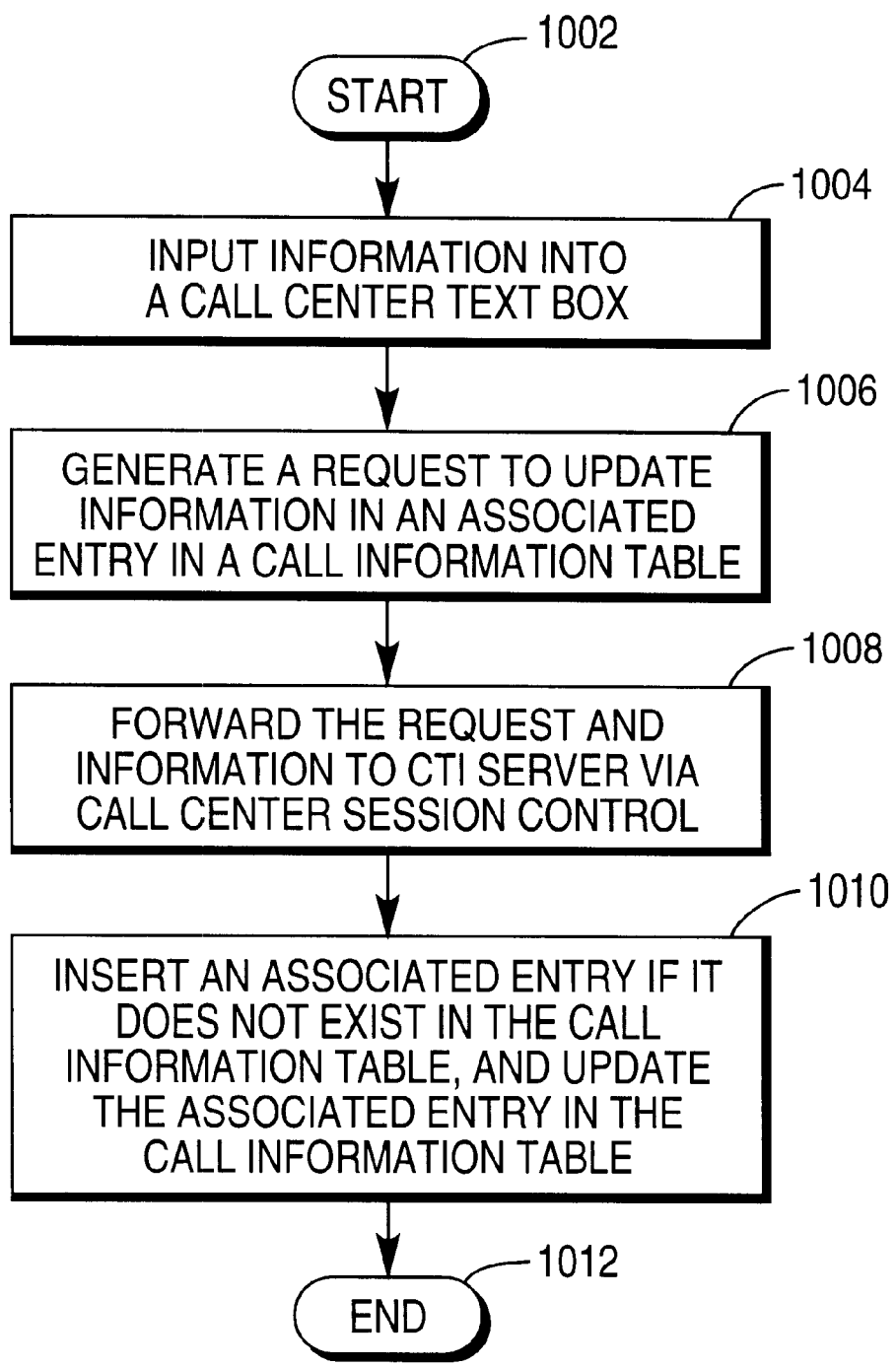
FIG. 10 shows a flowchart illustrating the operation of inputting information into (or changing information in) a call center text box and updating an associated entry in a call information table at run time, in accordance with the present invention.

Referring to FIG. 10, there is shown a flowchart illustrating the operation of inputting information into (or changing information in) a call center text box and updating an associated entry in a call information table at run time, in accordance with the present invention.

At step 1004, a user inputs information into (or changes information in) a call center text box. In the examples shown in FIG. 7C, the user first changes the information in address call center text box 708 and then inputs information in to comments call center box 714.

At step 1006, based on a loss of focus on the call center text box or the pressing of the "Enter" key, the call center text box (via routine A) generates a request to update information in an associated entry in a call information table.

In one example shown in FIG. 7C, address call center text box 708 generates a request to update address entry 208 in call information table 200 from "111 Oak Street" to "222 Elm Street". In the other example shown in FIG. 7C, comments call center box 714 generates a request to enter "Interested in installing a second line" into a comments entry in call information table 202.

At step 1008, the call center text box (via routine A) sends the request and information to call center session control 109, which in turn forwards the request and information to CTI server 106. In one example shown in FIG. 7C, address call center text box 708 sends the request and information "222 Elm Street" to call center session control 109, which in turn forwards the requests and information to CTI server 106. In the other example shown in FIG. 7C, comments call center text box 714 sends the request and information "Interested in installing a second line" to call center session control 109, which in turn forwards the request and information to CTI server 106.

At step 1010, upon receiving the request from call center session control 109, CTI server 106 stores the information into the entry associated with the call center text box in a call information table if such an entry exists. CTI server 106 inserts an entry into the call information table if such an entry does not exist in the call information table, and then stores the information into the inserted entry. In one example shown in FIG. 7C, in response to the request from address call center text box 708, CTI server 106 stores the information in address entry 208 in call information table 200. In the other example shown in FIG. 7C, in response to the request from comments call center text box 714, CTI server 106 first inserts a comments entry into call information table 200, and then stores the information of "Interested in installing a second line" in the inserted comments entry.

Figure 11:
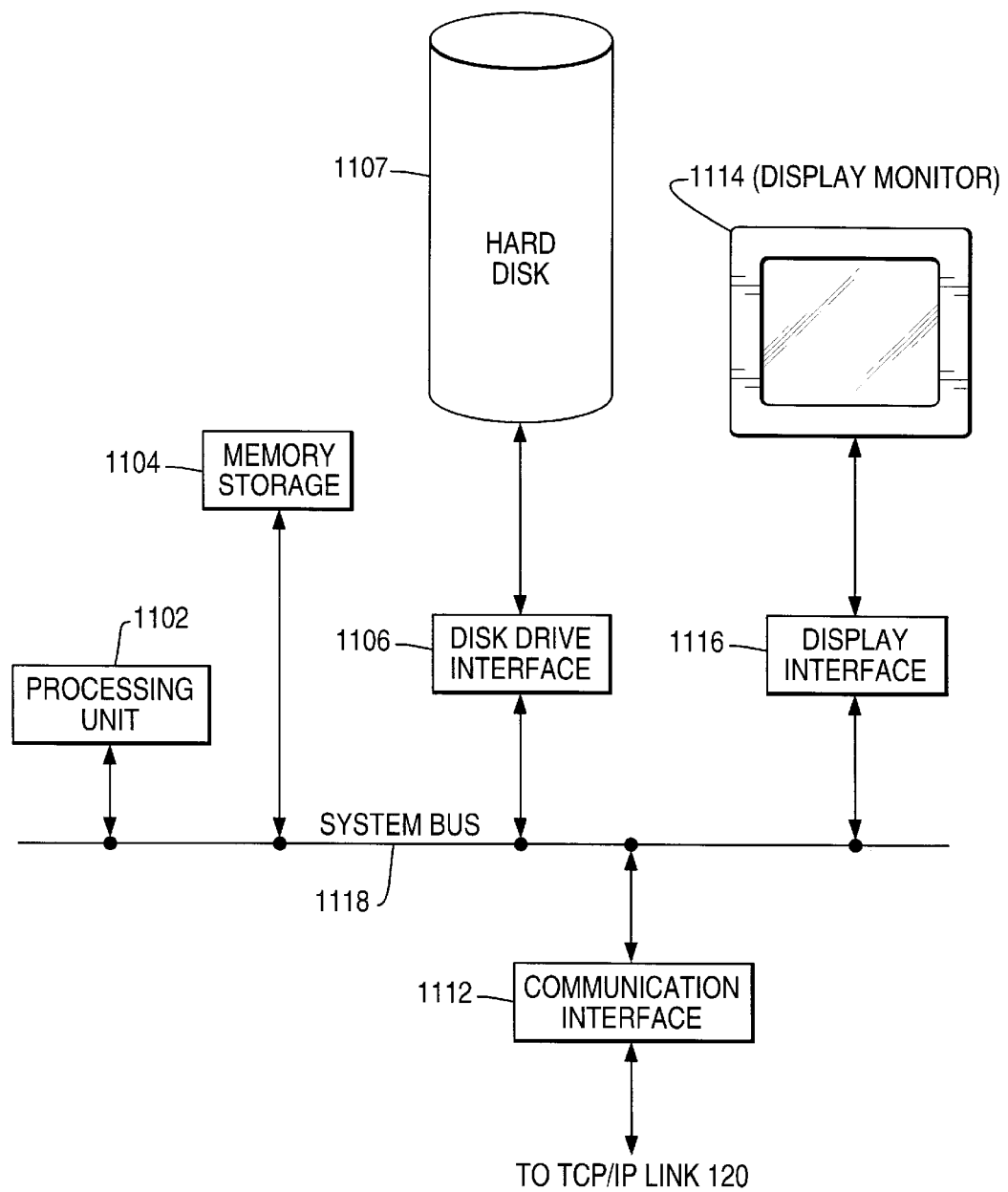
FIG. 11 shows block diagram illustrating one exemplary hardware configuration for a work station used by the CTI system shown in FIG. 1.

Referring to FIG. 11, there is shown a block diagram illustrating one exemplary hardware configuration for workstation 107 shown in FIG. 1. It should be noted that many different hardware configurations can also be used for workstation 107.

As shown in FIG. 10, workstation 107, which can be a PC computer, includes components: a processing unit 1102, a memory storage 1104, a disk drive interface 1106, a hard disk 1107, a communication interface 1112, a display interface 1116, and a display monitor 1114. The processing unit 1102, memory storage 1104, disk drive interface 1106, communication interface 1112, and display interface 1116 are inter-coupled with each other via a system bus 1108.

Memory storage 1104 is able to store programs and data.

Operating together with disk drive interface 1106, hard disk 1107 is also able to store programs and data. However, hard disk 1106 is nonvolatile and has higher capacity, while memory storage 1104 has faster access speed.

Operating together with display interface 1116, display monitor 1114 is able to display application interfaces that interact with application users.

Processing unit 1102 is able to execute the programs stored in memory storage 1104 or hard disk 1107, and to control the operations of the other components in workstation 107.

Communication interface 1112 is able to provide an interface between workstation 107 and TCP/IP link 120 (see FIG. 1).

Preferably, the programs (control program 610 and routines A) for performing the operations shown in FIGS. 8–10 are stored in memory storage 1104 and executed by processing unit 1102.

As stated above, the existing CTI development methods are often difficult to use and require CTI system developers and integrators to know the details about vendor specific telephony equipment and CTI server in a CTI system and to write multiple lines of code to perform a simple task. In addition, CTI system developers and integrators are required to keep track of the operational status of the telephony equipment, such as the state of each communication line in a call center.

In the present invention, the graphic interface is pre-programmed to generate a set of controls (commands) over telephony equipment. If a CTI system developer or integrator needs to create a call center text box in an application to collect and/or display textual information to be retrieved from or stored in a CTI server, he/she simply selects an image symbol (or uses a line of code) into the application. No additional work is required.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A method for displaying information on a client workstation, the information collected by a communication management server, comprising the steps of:
    (a) creating and displaying an object image symbol using a graphical user interface on the client workstation;
    (b) defining a behavior for said created object image symbol without requiring written programming code; and
    (c) collecting the information from the communication management server and displaying the information by a graphical object representing said object image symbol.

2. The method of claim 1, said steps (a) and (b) being performed at design time, and said step (c) being performed at run time.

3. The method of claim 1, wherein, in response to step (a), said step (b) being automatically performed, and a pre-existing section code for performing step (c) being automatically linked to said image object symbol.

4. The method of claim 1, further comprising the step of:
    (d) associating an entry in the communication server with said object image symbol, so that the information stored in said entry can be sent to said object image symbol at run time.

5. The method of claim 1, the communication management server being a CTI server.

6. The method of claim 5, further comprising forming and maintaining by the CTI server, a call information table.

7. The method of claim 1, wherein the information comprises at least one of the following: telephone number, customer name, address, city, state, account balance, Automatic Number Identification and Dialed Number Identification Service and said object image symbols represent at least one of the following: telephone number, customer name, address, city, state, account balance, Automatic Number Identification and Dialed Number Identification Service.

8. The method of claim 1, further comprising displaying command object image symbols on the client workstation.

9. The method of claim 8, further comprising activating a command object image symbol in response to the occurrence of an event.

10. The method of claim 1, wherein the creating step includes selecting a control symbol and linking the created object image symbol to a run time behavior.

11. The method of claim 1, comprising creating a property table and populating a column of the table with control properties.

12. The method for inputting telephone call information from a graphical user interface to a communication management database, comprising the steps of:
  (a) creating and displaying an object image symbol using the graphical user interface;
  (b) inputting the telephone call information into a text box representing the object image symbol; and
  (c) sending the inputted information to the communication management database and storing the sent information in the communication management database.

13. The method of claim 10, said step (a) being performed at design time, and said steps (b) and (c) being performed at run time.

14. The method of claim 12, in response to step (a), a pre-existing section code for performing step (c) being automatically linked to said image object symbol, so that said step (c) is automatically performed following step (b).

15. The method of claim 12, wherein the communication management database is associated with a CTI server.

16. The method of claim 12, wherein the information comprises at least one of the following: telephone number, customer name, address, city, state, account balance, Automatic Number Identification and Dialed Number Identification Service and said object image symbols represent at least one of the following: telephone number, customer name, address, city, state, account balance, Automatic Number Identification and Dialed Number Identification Service.

17. The method of claim 16, further comprising forming and maintaining by the CTI server, a call information table.

18. The method of claim 12, further comprising displaying command object image symbols on the client workstation.

19. The method of claim 18, further comprising activating a command object image symbol in response to the occurrence of an event.

20. The method of claim 12, wherein the creating step includes selecting a control symbol and linking the created object image symbol to a run time behavior.

21. The method of claim 12, comprising creating a property table and populating a column of the table with control properties.

22. The method for inputting telephone call information from a graphical user interface to a communication management server and creating a table in a database in the communication management server, comprising the steps of:
  (a) creating and displaying an object image symbol using the graphical user interface;
  (b) inputting telephone call information into a said object image symbol;
  (c) creating an entry in the table in the database; and
  (d) sending said inputted information to the table in the communication management server and storing the sent information in the communication management database.

23. The method of claim 22, said step (a) being performed at design time, and said steps (b), (c) and (d) being performed at run time.

24. The method of claim 22, in strep (a), a preexisting section code for performing steps (c) and (d) being automatically linked to said image object symbol, so that said steps (c) and (d) are automatically performed following step (b).

25. The method of claim 22, the communication management server being a CTI server.

26. The method of claim 22, wherein the information comprises at least one of the following: telephone number, customer name, address, city, state, account balance, Automatic Number Identification and Dialed Number Identification Service and said object image symbols represent at least one of the following: telephone number, customer name, address, city, state, account balance, Automatic Number Identification and Dialed Number Identification Service.

27. The method of claim 22, further comprising displaying command object image symbols on the client workstation.

28. The method of claim 27, further comprising activating a command object image symbol in response to the occurrence of an event.

29. The method of claim 22, wherein the creating step includes selecting a control symbol and linking the created object image symbol to a run time behavior.

30. The method of claim 22, comprising creating a property table and populating a column of the table with control properties.

* * * * *